(12) United States Patent
Yang et al.

(10) Patent No.: US 11,320,003 B2
(45) Date of Patent: May 3, 2022

(54) COOLING STRUCTURE FOR HYBRID POWERTRAIN OF VEHICLE

(71) Applicants: Hyundai Motor Company, Seoul (KR); Kia Motors Corporation, Seoul (KR)

(72) Inventors: Hong Seok Yang, Suwon-Si (KR); Kyoung Bum Kim, Yongin-Si (KR); Hee Ra Lee, Anyang-Si (KR); Jae Won Ha, Hwaseong-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 17/164,675

(22) Filed: Feb. 1, 2021

(65) Prior Publication Data
US 2022/0065309 A1    Mar. 3, 2022

(30) Foreign Application Priority Data

Sep. 3, 2020 (KR) .................. 10-2020-0112261

(51) Int. Cl.
| | |
|---|---|
| B60K 6/48 | (2007.10) |
| B60K 11/02 | (2006.01) |
| F16D 25/12 | (2006.01) |
| F16H 45/02 | (2006.01) |
| B60K 1/00 | (2006.01) |

(52) U.S. Cl.
CPC .............. *F16D 25/123* (2013.01); *B60K 6/48* (2013.01); *B60K 11/02* (2013.01); *F16H 45/02* (2013.01); *B60K 2001/006* (2013.01); *B60K 2006/4825* (2013.01); *F16H 2045/0215* (2013.01)

(58) Field of Classification Search
CPC ......... F16D 25/123; B60K 6/48; B60K 11/02; B60K 2001/006; B60K 2006/4825; F16H 2045/0215
See application file for complete search history.

(56) References Cited

U.S. PATENT DOCUMENTS

| 6,862,887 | B2* | 3/2005 | Noreikat | ................. | B60K 6/40 60/716 |
| 2005/0206251 | A1* | 9/2005 | Foster | .................... | H02K 9/197 310/59 |
| 2007/0202989 | A1* | 8/2007 | Ortmann | ............... | F16D 25/123 477/166 |

(Continued)

FOREIGN PATENT DOCUMENTS

KR    10-2013-0044873 A    5/2013

*Primary Examiner* — Richard W Ridley
*Assistant Examiner* — Aimee Tran Nguyen
(74) *Attorney, Agent, or Firm* — Morgan, Lewis & Bockius LLP

(57) ABSTRACT

A cooling structure for a hybrid powertrain apparatus of a vehicle may include: a first rotor shaft coaxially connected to an engine output shaft and connected to a rotor of a first motor; an engine clutch shaft coaxially connected to the first rotor shaft not to rotate and connected to an engine clutch; a transmission input shaft mounted coaxially with the engine clutch shaft not to rotate by a rotor of a second motor connected to the engine clutch; and a cooling channel formed in the transmission input shaft to be able to supply oil for simultaneously cooling the first motor, the second motor, and the engine clutch.

13 Claims, 5 Drawing Sheets

(56) References Cited

U.S. PATENT DOCUMENTS

| | | | |
|---|---|---|---|
| 2009/0029820 A1* | 1/2009 | Nishida | F16D 25/123 475/159 |
| 2012/0091835 A1* | 4/2012 | Kim | H02K 9/19 310/54 |
| 2017/0114885 A1* | 4/2017 | Yamada | B60K 6/365 |
| 2021/0197795 A1* | 7/2021 | Lehmann | B60K 11/04 |

* cited by examiner

COOLING STRUCTURE FOR HYBRID POWERTRAIN OF VEHICLE

CROSS REFERENCE TO RELATED APPLICATION

The present application claims priority to Korean Patent Application No. 10-2020-0112261, filed Sep. 3, 2020, the entire contents of which is incorporated herein for all purposes by this reference.

BACKGROUND OF THE INVENTION

Field of the Invention

The present invention relates to a cooling structure for a hybrid powertrain of a vehicle.

Description of Related Art

A hybrid powertrain may be classified into a Flywheel Mounted Electric Device (FMED) type and a Transmission Mounted Electric Device (TEMD) type, each of which has advantages and disadvantages.

The present invention relates to a powertrain which is not simply the FEMD type or the TMED type, but utilizes a combination of the FMED type and the TMED type.

That is, the present invention relates to a hybrid powertrain in which a first motor is mounted at the output shaft of an engine, a second motor is mounted at the input shaft of a transmission, and the first motor and the second motor are connected by an engine clutch.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a cooling structure that can effectively cool a first motor, a second motor, and an engine clutch, can improve durability of the vehicle, and can secure stable power transmission performance in a hybrid powertrain of a vehicle in which a first motor is mounted at the output shaft of an engine, a second motor is mounted at the input shaft of a transmission, and an engine clutch is mounted between the first and second motors.

To achieve the objectives, a cooling structure for a hybrid powertrain of a vehicle according to various exemplary embodiments of the present invention may include a first rotor shaft coaxially connected to an engine output shaft and connected to a rotor of a first motor; an engine clutch shaft coaxially connected to the first rotor shaft not to rotate and connected to an engine clutch; a transmission input shaft mounted coaxially with the engine clutch shaft not to rotate by a rotor of a second motor connected to the engine clutch; and a cooling channel formed in the transmission input shaft to be configured to supply oil for simultaneously cooling the first motor, the second motor, and the engine clutch.

The engine clutch shaft and the first rotor shaft radially may overlap each other, forming an oil chamber for storing the oil which is supplied through the cooling channel of the transmission input shaft.

The engine clutch shaft may be a hollow shaft for communicating with the cooling channel of the transmission input shaft, and the first rotor shaft may have a hole to be configured to receive oil supplied through the engine clutch shaft and forms the oil chamber.

A first cooling hole may be formed in the first rotor shaft to supply the oil in the oil chamber to the first motor.

The rotor of the first motor may be fixed to a first rotor hub, the first rotor hub may be connected to the first rotor shaft through an internal flange, and a plurality of first cooling holes axially spaced from each other may be formed to supply oil to both sides of the internal flange of the first rotor hub.

A second cooling hole may be formed in the engine clutch shaft to supply the oil in the oil chamber to the second motor.

The engine clutch may connect or disconnect the engine clutch shaft and the rotor of the second motor, and a third cooling hole may be formed in the transmission input shaft to supply the oil in the cooling channel to the engine clutch.

The rotor of the second motor may be disposed radially outside the engine clutch and is fixed to the second rotor hub; the second rotor hub may have a journal portion at a center; an internal side of the journal portion may be supported by a first bearing disposed between the journal portion and the engine clutch shaft, and an external side of the journal portion may be supported on a housing by a second bearing; and the second cooling hole may be positioned such that oil from the oil chamber flows through the first bearing and the second bearing.

A first communication hole may be formed in the journal portion of the second rotor hub so that oil passing through the first bearing flows into the second bearing.

The second rotor hub may have a sensor flange for mounting a resolver for detecting a position of the rotor of the second motor; and a second communication hole may be formed in the sensor flange so that oil passing through the second bearing flows into a radial direction of the second rotor hub toward the rotor and a stator of the second motor.

The engine clutch may be configured by stacking a plurality of friction plates between a clutch hub at an internal side and a clutch retainer at an external side; the clutch hub may be connected to the engine clutch shaft; the clutch retainer may be connected to a connection plate connecting the second rotor hub to the transmission input shaft; a third communication hole may be formed in the clutch hub so that the oil supplied from the third cooling hole flows through the friction plates; and a fourth communication hole may be formed in the clutch retainer so that oil passing through the friction plates is discharged between the clutch retainer and the second rotor hub.

A fifth communication hole may be formed in the second rotor hub so that oil discharged from the fourth communication hole flows toward a stator of the second motor.

According to various exemplary embodiments of the present invention, it is possible to effectively cool a first motor, a second motor, and an engine clutch, to improve durability of the vehicle, and to secure stable power transmission performance in a hybrid powertrain of a vehicle in which a first motor is mounted at the output shaft of an engine, a second motor is mounted at the input shaft of a transmission, an engine clutch is mounted between the first and second motors.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
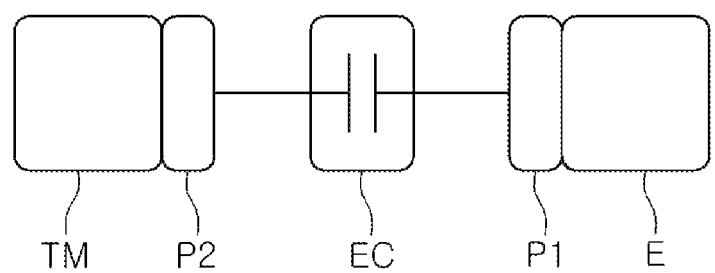
FIG. 1 is a view showing the configuration of a hybrid powertrain of a vehicle to which various exemplary embodiments of the present invention may be applied.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Referring to FIG. 1, in a hybrid powertrain to which various exemplary embodiments of the present invention may be applied, a first motor P1 is connected to an engine E, a second motor P2 is connected to an input shaft of a transmission TM, and an engine clutch EC is mounted between the first motor P1 and the second motor P2.

Referring to FIGS. 2 to 5, an exemplary embodiment of the cooling structure for a hybrid powertrain of a vehicle of the present invention includes: a first rotor shaft 1 coaxially connected to an engine output shaft and connected to a rotor R1 of a first motor P1; an engine clutch shaft 3 coaxially connected to the first rotor shaft 1 not to rotate and connected to an engine clutch EC; a transmission input shaft 5 mounted coaxially with the engine clutch shaft 3 not to rotate by a rotor R2 of a second motor P2 connected to the engine clutch EC; and a cooling channel 7 formed in the transmission input shaft 5 to be able to supply oil for simultaneously cooling the first motor P1, the second motor P2, and the engine clutch EC.

That is, the present invention is configured to be able to simultaneously cool the first motor P1, the second motor P2, and the engine clutch EC using oil supplied through the cooling channel 7 of the transmission input shaft 5 in a powertrain structure in which the first rotor shaft 1, the engine clutch shaft 3, and the transmission input shaft 5 are sequentially coaxially mounted, and the first motor P1, the second motor P2, and the engine clutch EC are supported by them.

Figure 2:
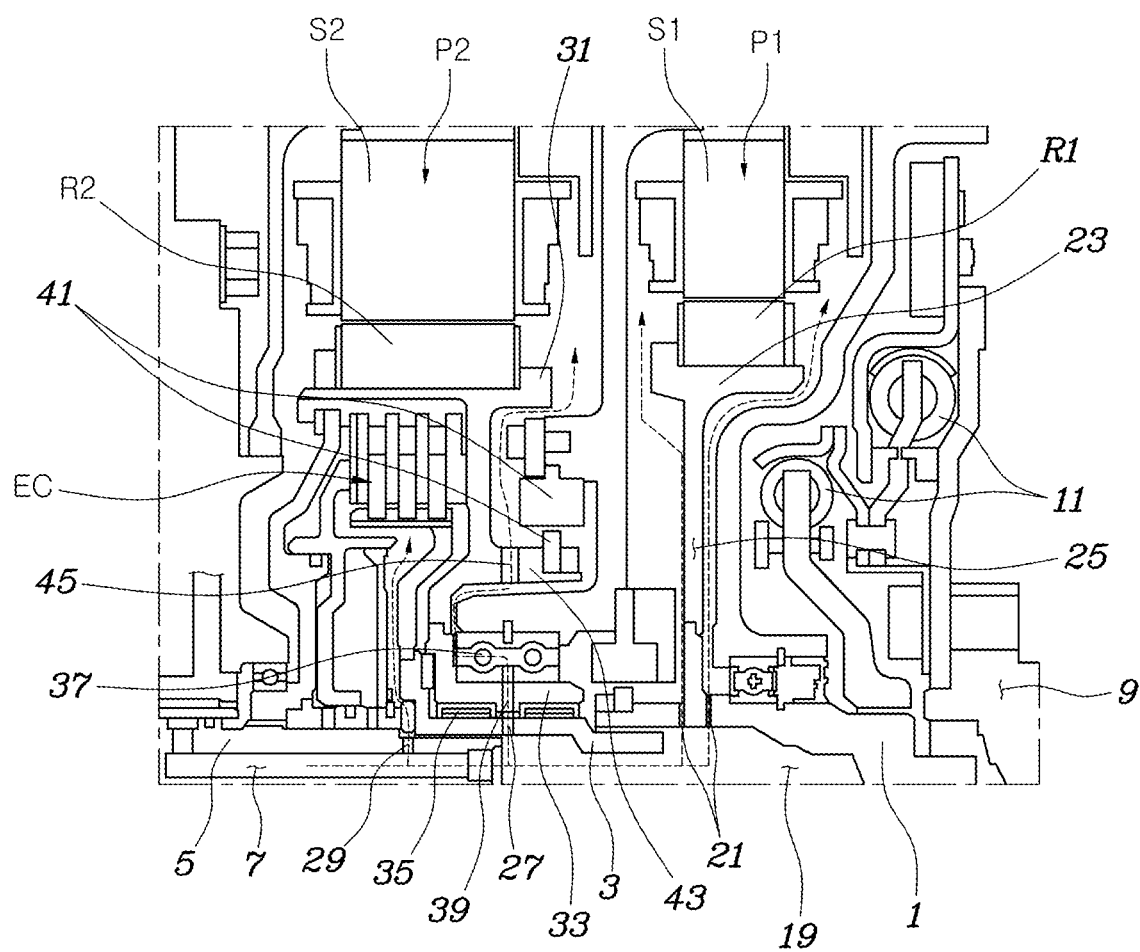
FIG. 2 is a view showing a cooling structure for a hybrid powertrain of a vehicle according to various exemplary embodiments of the present invention.
Figure 3:
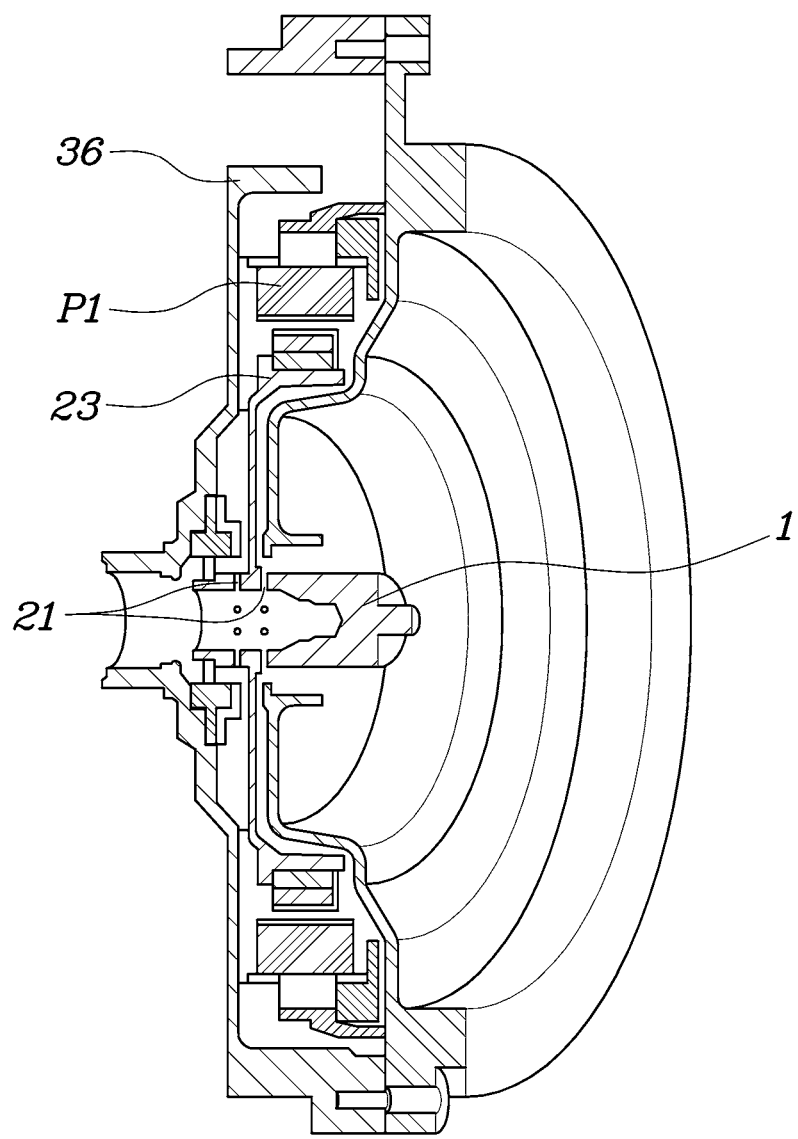
FIG. 3 is a view showing the first motor portion of FIG. 2.
Figure 4:
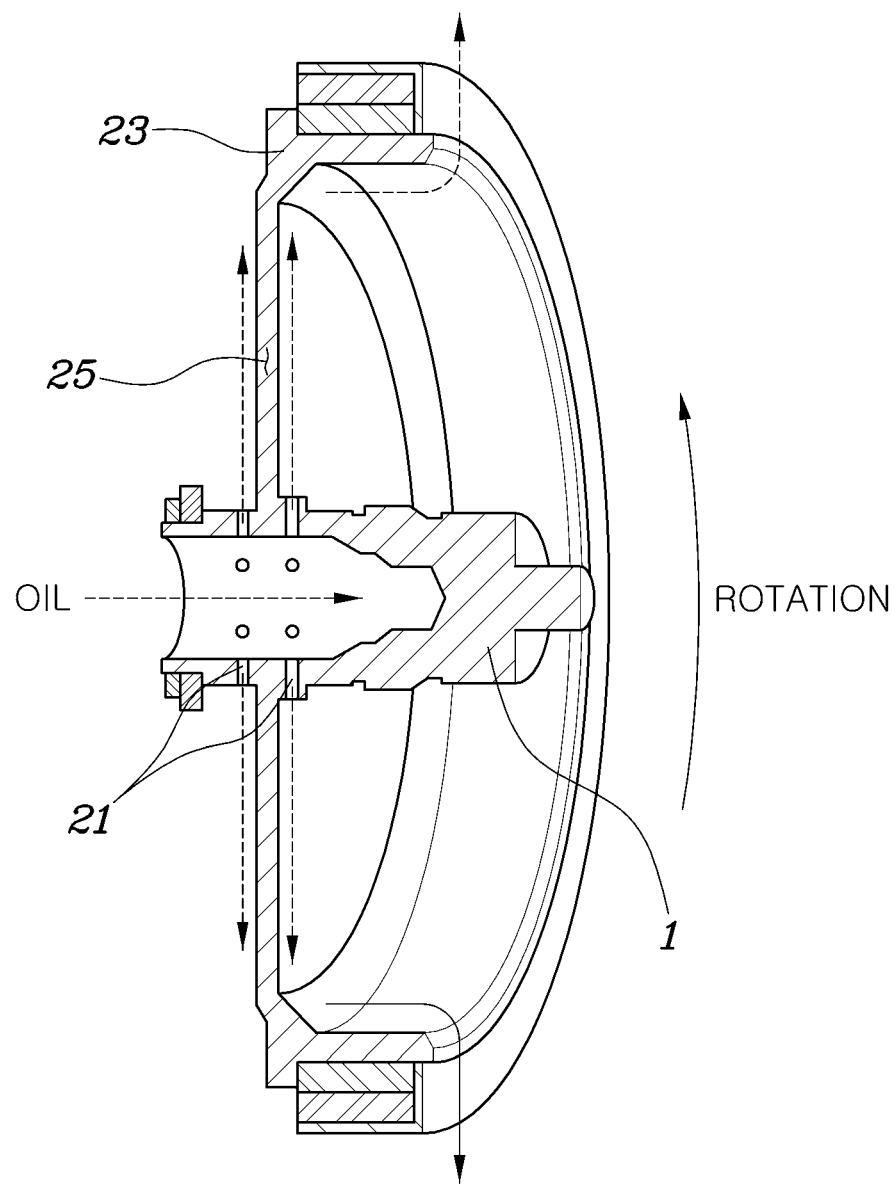
FIG. 4 is a view showing a first rotor shaft and a first cooling hole of FIG. 3.

For reference, in FIG. 2, the first rotor shaft 1 is connected to a crankshaft 9 of the engine E through a damper 11 to be able to absorb vibration of the engine E.

Figure 5:
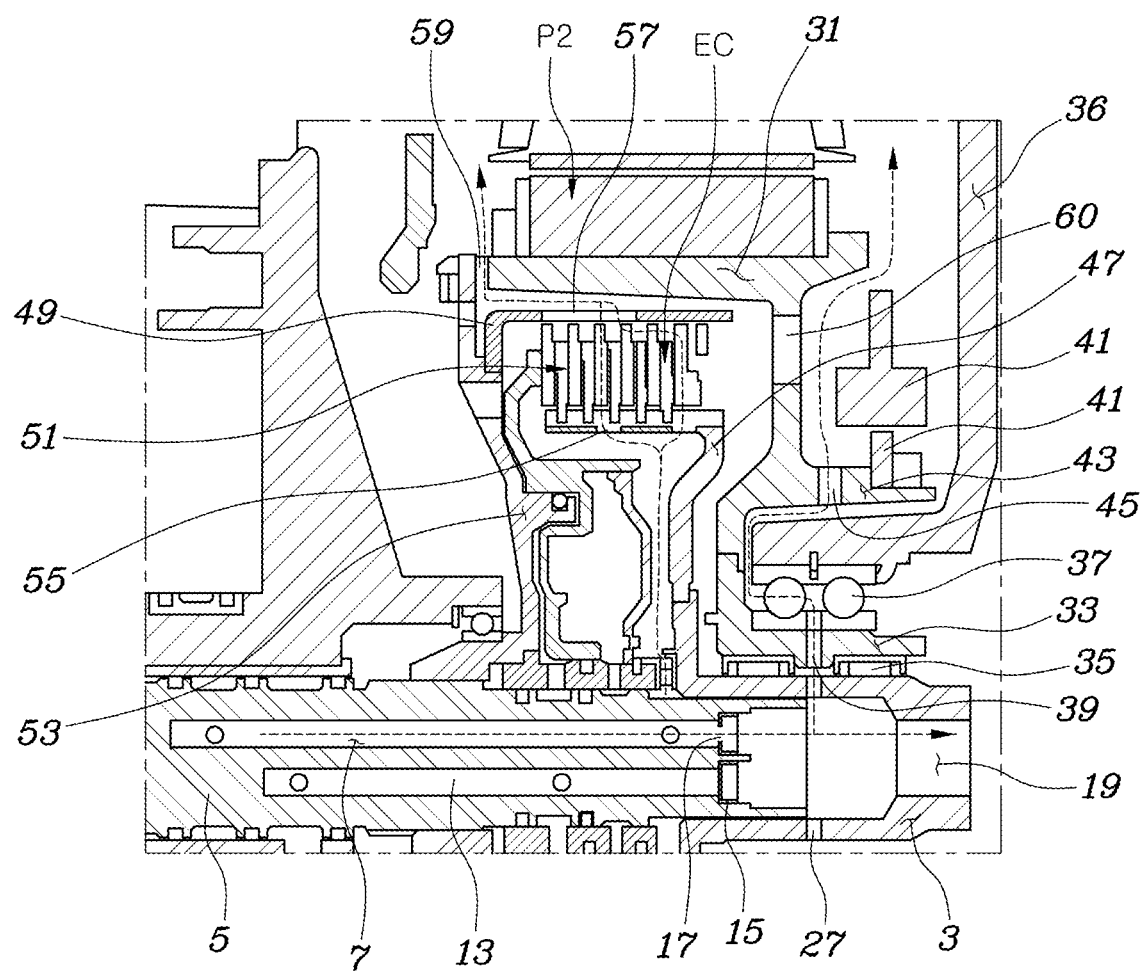
FIG. 5 is a view showing an engine clutch and as second motor portion of FIG. 2.

As shown in FIG. 5, other than the cooling channel 7, a control channel 13 for supplying control hydraulic pressure for controlling the engine clutch EC is formed in the transmission input shaft 5. An end portion of the control channel 13 is closed by a cap 15 and an oil supply hole 17 is formed in a cap at the end portion of the cooling channel 7 so that the amount of oil which is supplied through the cooling channel 7 may be adjusted.

The engine clutch shaft 3 and the first rotor shaft 1 radially overlap each other, forming an oil chamber 19 for keeping oil which is supplied through the cooling channel 7 of the transmission input shaft 5.

The engine clutch shaft 3 is a hollow shaft for communicating with the cooling channel 7 of the transmission input shaft 5. The first rotor shaft 1 has a hole to be able to receive oil supplied through the engine clutch shaft 3 and forms the oil chamber 19 in cooperation with the transmission input shaft 5.

Accordingly, the oil supplied through the cooling channel 7 of the transmission input shaft 5 and the oil supply hole 17 is stored in the oil chamber 19, whereby oil for cooling the first motor P1, the second motor P2, and the engine clutch EC may be stably supplied.

A first cooling hole 21 is formed in the first rotor shaft 1 to supply oil in the oil chamber 19 to the first motor P1.

That is, the rotor of the first motor P1 is fixed to a first rotor hub 23 and the first rotor hub 23 is connected to the first rotor shaft 1 through an internal flange 25. A plurality of first cooling holes 21 axially spaced from each other is formed to supply oil to both sides of the internal flange 25 of the first rotor hub 23.

Accordingly, when the first rotor shaft 1 is rotated, the oil in the oil chamber 19 is sprayed to both sides of the internal flange 25 of the first rotor hub 23 through the first cooling hole 21 and moved toward the rotor R1 and the stator S1 of the first motor P2, performing cooling.

A second cooling hole 27 is formed in engine clutch shaft 3 to supply oil in the oil chamber 19 to the second motor P2.

The engine clutch EC connects or disconnects the engine clutch shaft 3 and the rotor of the second motor P2, and a third cooling hole 29 is formed in the transmission input shaft 5 to supply the oil in the cooling channel 7 to the engine clutch EC.

The rotor of the second motor P2 is mounted radially outside the engine clutch and is fixed to a second rotor hub 31. The second rotor hub 31 has a journal portion 33 at the center thereof, the internal side of the journal portion 33 is supported by a first bearing 35 mounted between the journal portion 33 and the engine clutch shaft 3, and the external side of the journal portion 33 is supported on a housing 36 by a second bearing 37. The second cooling hole 27 is positioned such that the oil from the oil chamber 19 flows through the first bearing 35 and the second bearing 37.

A first communication hole 39 is formed in the journal portion 33 of the second rotor hub 31 so that the oil passing through the first bearing 35 flows into the second bearing 37.

Accordingly, the oil flowing to the second cooling hole 27 from the oil chamber 19 flows through the first bearing 35 and then the first communication hole 39 so that the second bearing 37 may be lubricated and cooled.

The second rotor hub 31 has a sensor flange 43 for mounting a resolver 41 for detecting a position of the rotor of the second motor P2. A second communication hole 45 is formed in the sensor flange 43 so that the oil passing through the second bearing 37 flows into the radial direction of the second rotor hub 31 toward the rotor R2 and the stator S2 of the second motor P2.

Accordingly, the oil lubricating the second bearing 37, as shown in FIG. 5, flows radially outward on the side of the second rotor hub 31 and flows through the second communication hole 45 to cool the rotor and the stator of the second motor P2.

The engine clutch EC is configured by stacking a plurality of friction plates 51 between a clutch hub 47 at the internal side and a clutch retainer 49 at the external side thereof. The clutch hub 47 is connected to the engine clutch shaft 3. The clutch retainer 49 is connected to a connection plate 53 connecting the second rotor hub 31 to the transmission input shaft 5. A third communication hole 55 is formed in the clutch hub 47 so that the oil supplied from the third cooling hole 29 flows through the friction plates 51. A fourth communication hole 57 is formed in the clutch retainer 49 so that the oil passing through the friction plates 51 is discharged between the clutch retainer 49 and the second rotor hub 31.

Accordingly, the oil supplied radially outward through the third cooling hole 29 of the transmission input shaft 5 cools the friction plates 51 through the third communication hole 55 of the clutch hub 47 and is then discharged to the fourth communication hole 57 of the clutch retainer 49.

A fifth communication hole 59 is formed in the second rotor hub 31 so that the oil discharged from the fourth communication hole 57 flows toward the stator of the second motor P2.

Accordingly, the oil discharged from the fourth communication hole 57 flows on the internal side of the second rotor hub 31 and the flows toward the rotor and the stator of the second motor P2 through the fifth communication hole 59.

For reference, for the oil discharged from the fourth communication hole 57 to smoothly flow to the fifth communication hole 59, the internal circumferential surface of the second rotor hub 31 is inclined such that internal diameter gradually increases toward the portion where the fifth communication hole 59 is formed.

According to various exemplary embodiments of the present invention, as described above, the oil supplied through the cooling channel 7 formed in the transmission input shaft 5 flows radially outward through the first cooling hole 21, the second cooling hole 27, and the third cooling hole 29 such that the first motor P1, the second motor P2, and the engine clutch EC may be effectively cooled. Therefore, it is possible to secure continuous and stable power performance of the powertrain and improve the durability thereof.

In an exemplary embodiment of the present invention, a sixth communication hole 60 is formed on the second rotor hub 31 so that the inner space of the engine clutch EC is fluidically connected to the second communication hole 45.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A cooling structure for a hybrid powertrain apparatus of a vehicle, the cooling structure comprising:
   a first rotor shaft connected to a rotor of a first motor and configured to be coaxially connected to an engine output shaft;
   an engine clutch shaft coaxially connected to the first rotor shaft not to rotate and connected to an engine clutch;
   a transmission input shaft mounted coaxially with the engine clutch shaft wherein rotation of the transmission input shaft is restricted by a rotor of a second motor connected to the engine clutch; and
   a cooling channel formed in the transmission input shaft to supply oil for cooling the first motor, the second motor, and the engine clutch,
   wherein the engine clutch shaft and the first rotor shaft radially overlap each other, forming an oil chamber for storing the oil which is supplied through the cooling channel of the transmission input shaft.

2. The cooling structure of claim 1,
   wherein the engine clutch shaft is a hollow shaft, in which an inner space of the hollow shaft fluidically-communicates with the cooling channel of the transmission input shaft, and
   wherein the first rotor shaft has a hole to receive the oil supplied through the engine clutch shaft and forms the oil chamber between the first rotor shaft and the engine clutch shaft.

3. The cooling structure of claim 2, wherein a first cooling hole is formed in the first rotor shaft to supply the oil in the oil chamber to the first motor.

4. The cooling structure of claim 3,
   wherein the rotor of the first motor is fixed to a first rotor hub,
   wherein the first rotor hub is connected to the first rotor shaft through an internal flange, and
   wherein the first cooling hole supplies the oil to front and rear surfaces of the internal flange of the first rotor hub.

5. The cooling structure of claim 4,
   wherein the first cooling hole is in plural to form a plurality of first cooling holes,
   wherein a predetermined number of the first cooling holes are positioned in a front side of the internal flange of the first rotor hub in an axial direction of the first rotor hub to supply the oil on the front surface of the internal flange, and
   wherein a remaining number of the first cooling holes are positioned in a rear side of the internal flange of the first rotor hub in the axial direction of the first rotor hub to supply the oil on the rear surface of the internal flange.

6. The cooling structure of claim 3, wherein a second cooling hole is formed in the engine clutch shaft to supply the oil in the oil chamber to the second motor.

7. The cooling structure of claim 6,
wherein the engine clutch is configured to selectively connect the engine clutch shaft and the rotor of the second motor, and
wherein a third cooling hole is formed in the transmission input shaft to supply the oil in the cooling channel to the engine clutch.

8. The cooling structure of claim 7,
wherein the rotor of the second motor is mounted radially outside the engine clutch and is fixed to a second rotor hub,
wherein the second rotor hub has a journal portion at a center thereof,
wherein an internal side of the journal portion is supported by a first bearing mounted between the journal portion and the engine clutch shaft, and an external side of the journal portion is supported on a housing by a second bearing, and
wherein the second cooling hole is positioned so that the oil from the oil chamber flows through the first bearing and the second bearing.

9. The cooling structure of claim 8, wherein a first communication hole is formed in the journal portion of the second rotor hub so that the oil passing through the first bearing flows into the second bearing.

10. The cooling structure of claim 9,
wherein the second rotor hub has a sensor flange for mounting a resolver for detecting a position of the rotor of the second motor, and
wherein a second communication hole is formed in the sensor flange so that the oil passing through the second bearing flows into a radial direction of the second rotor hub toward the rotor and a stator of the second motor.

11. The cooling structure of claim 10, wherein a sixth communication hole is formed on the second rotor hub so that an inner space of the engine clutch is fluidically connected to the second communication hole.

12. The cooling structure of claim 8,
wherein the engine clutch includes a plurality of friction plates stacked between a clutch hub and a clutch retainer of the engine clutch,
wherein the clutch hub is connected to the engine clutch shaft,
wherein the clutch retainer is connected to a connection plate connecting the second rotor hub to the transmission input shaft,
wherein a third communication hole is formed in the clutch hub so that the oil supplied from the third cooling hole flows through the plurality of friction plates via the third communication hole, and
wherein a fourth communication hole is formed in the clutch retainer so that the oil passing through the plurality of friction plates is discharged between the clutch retainer and the second rotor hub via the fourth communication hole.

13. The cooling structure of claim 12, wherein a fifth communication hole is formed in the second rotor hub so that the oil discharged from the fourth communication hole flows toward the stator of the second motor.

* * * * *